May 19, 1925.
C. R. SHORT
TRANSMISSION BELT
Filed Dec. 28, 1921
1,538,303
2 Sheets-Sheet 1
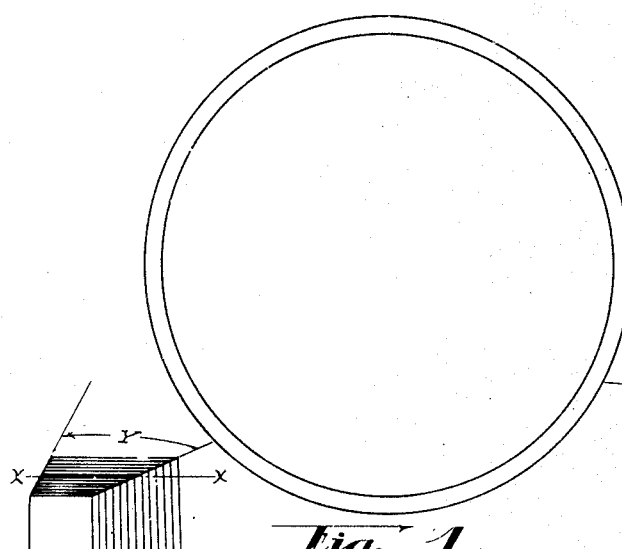
Fig. 1.
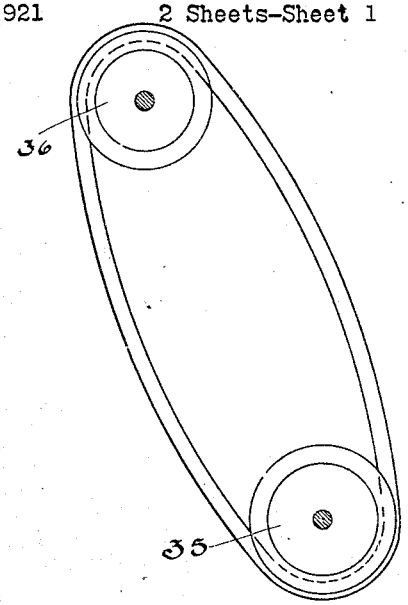
Fig. 2.
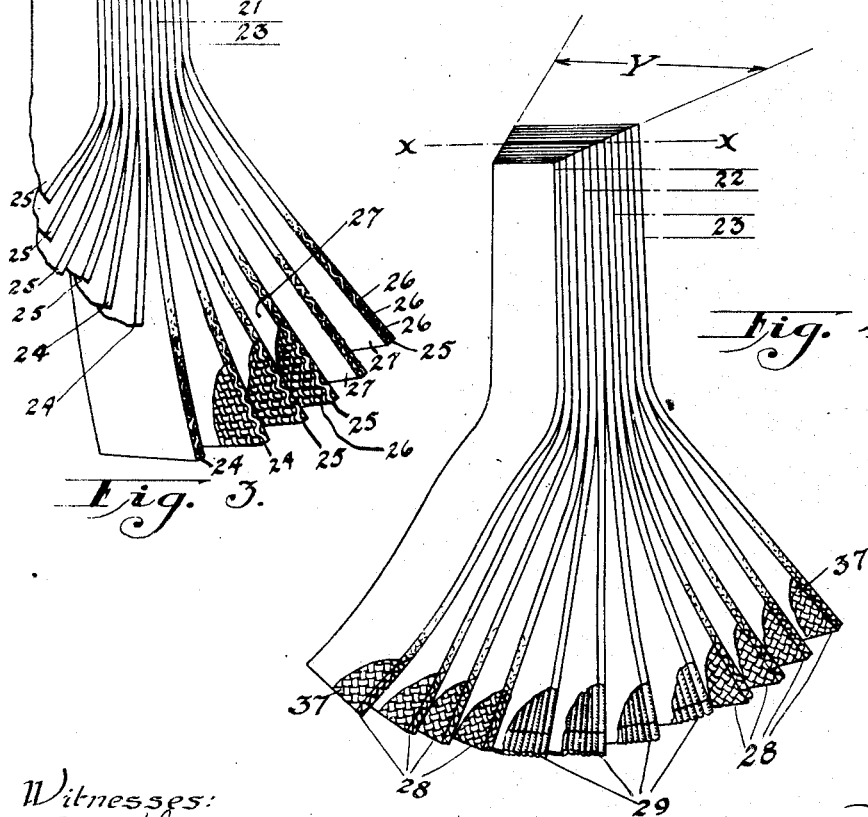
Fig. 4.
Fig. 3.
Witnesses:
R. A. Lee
L. H. Emrick
Inventor
Charles R. Short
By Francis D. Hardesty
Attorney May 19, 1925.                          1,538,303
C. R. SHORT
TRANSMISSION BELT
Filed Dec. 28, 1921          2 Sheets-Sheet 2

Witnesses
R. K. Lee
L. H. Emrich

Inventor.
Charles R. Short.
By Francis D. Hardesty
Attorney

Patented May 19, 1925.

1,538,303

UNITED STATES PATENT OFFICE.

CHARLES R. SHORT, OF DAYTON, OHIO, ASSIGNOR, BY DIRECT AND MESNE ASSIGNMENTS, OF THREE-FOURTHS TO GENERAL MOTORS RESEARCH CORPORATION, OF DAYTON, OHIO, A CORPORATION OF DELAWARE, AND ONE-FOURTH TO THE DAYTON RUBBER MANUFACTURING COMPANY, OF DAYTON, OHIO, A CORPORATION OF OHIO.

TRANSMISSION BELT.

Application filed December 28, 1921. Serial No. 525,356.

*To all whom it may concern:*

Be it known that I, CHARLES R. SHORT, a subject of the King of Great Britain, residing at Dayton, county of Montgomery, and State of Ohio, have invented certain new and useful Improvements in Transmission Belts, of which the following is a full, clear, and exact description.

This invention relates to transmission belts and more particularly to belts of the type employed with V-groove pulleys. So far as I am aware V-shaped transmission belts employed heretofore have been relatively short lived because of the large amount of rubber employed which generates heat under flexure, the poor transmission of this heat to the outside of the belt, uneven wear on the pulley engaging surface, and the longitudinal stiffness of the belts. The principal objects of the present invention are to overcome these difficulties and to promote the life of the belts.

Of the accompanying drawings,—

Fig. 1 is a side view of a belt embodying the present invention;

Fig. 2 is a side view of the belt mounted on pulley wheels;

Fig. 3 is a perspective view of a portion of the belt;

Fig. 4 is a perspective view of a modified form of belt;

Figure 5:
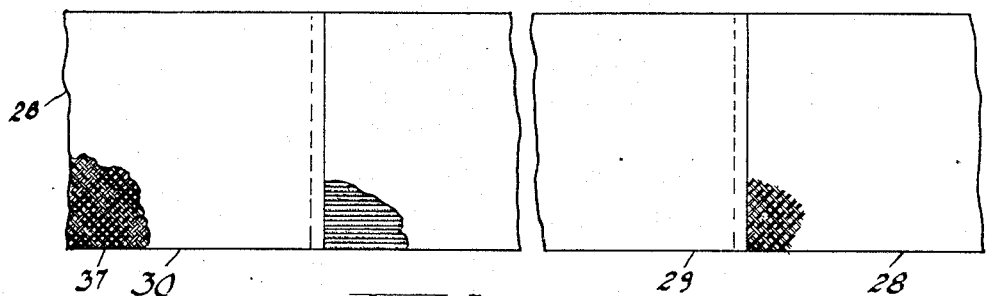
Fig. 5 is a plan view of a series of fabric strips joined to form a long length employed in the manufacture of a belt.
Figure 6:
Fig. 6 is a side view of a drum on which the belts are formed and illustrates one step in the process of manufacture.
Figure 7:
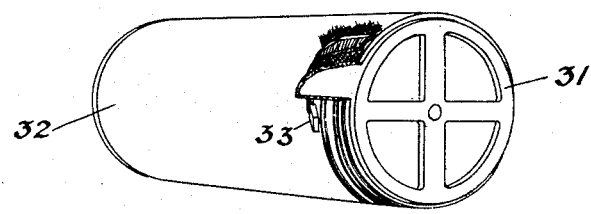
Fig. 7 is a perspective view, partly in section, of a drum covered with a rubber-fabric cylinder and illustrates another step in the manufacture of a belt.

In the drawings, 20 is an endless belt, V-shape in cross-section and having a medial portion 21 formed of one or more layers (herein four) of substantially non-stretchable fabric, an inner portion 22 formed of layers of a fabric capable of contracting when the belt is in operation and an outer portion 23 formed of layers of a fabric capable of circumferential extension.

In one form of the invention the fabric employed in the layers 24 forming the medial portion of the belt is a straight laid, square-woven fabric which is tightly woven to avoid a material stretching under tension during use but it is within the scope of my invention to use a loosely woven fabric and substantially remove the natural stretch due chiefly to the weave of the threads during the process of manufacture. The number of plies of fabric employed in this portion of the belt depends upon the strength desired in the belt and the particular use to which it is put but I prefer to use as few layers as possible in order to avoid an elongation or contraction of these plies when the belt is bent on a short radius. This portion of the belt carries the greater part of the load and the neutral axis X of the belt lies within these layers.

The portions 22 and 23 are each formed of four layers of loosely woven strips 25, Fig. 3, which yield longitudinally during the movement of the belt over a pulley but which preferably resist compression crosswise of the belt due chiefly to the transverse threads 26. The cross-threads may be formed with a relatively tight twist to increase the resistance of the belt to compression under the wedging action of the pulley flange and the longitudinal threads may be more loosely twisted to increase the flexing properties of the superimposed layers longitudinally of the belt.

The layers of fabric are secured together by a bonding material such as a rubber-composition which may be applied to the separate layers as a skin coating 27.

The use of a bias-cut fabric in a belt to obtain a longitudinally yielding structure is well-known and I may employ bias-cut fabric strips 28, Fig. 4, in the belt portions 22 and 23, the strips being preferably cut on a forty-five degree angle. I may also substitute a thread fabric strip 29 in place of the straight laid fabric strips 24, or I may form cord convolutions in layers to produce a similar medial portion. It is preferable to have adjacent convolutions substantially in contact to carry the heat rapidly from the interior of the belt to the outer walls thereof and to resist lateral compression.

The belts may be manufactured separately from strips of different widths and the natural stretch in the neutral axis portion of the belt may be taken out during or subsequent to the forming of the belts where this is necessary. It has been found that cost of production may be materially reduced by forming a length 30 composed of the fabric strips 28 and 29 joined end to end, winding the length under tension on a drum 31 (which may be collapsible) to form a rubber-fabric cylinder 32, wrapping the cylinder with fabric, and curing in open steam. The drum 31 is rotated, the cylinder is cut into belts by means of a knife 33 which is gradually forced inwardly of the drum through the cylinder at an angle to the axis of the latter and the belts are removed from the drum. The material in the intermediate triangular portions 34 cut from the cylinder may be reclaimed.

If the belts are molded separately some of the rubber-composition may be forced onto the wearing surface of the belt. The amount of rubber-composition employed is preferably so chosen that the skin coating thus formed on these surfaces is very thin so that it will wear away quickly and leave the ends of the cross-threads exposed.

The belts preferably are formed with a relatively large angle Y between the side walls of the belt and the latter is applied to pulleys 35 and 36, under a relatively light tension as shown in Fig. 2. During rapid acceleration of an engine the belt will slip on the pulleys and relieve the belt and journal bearings of the heavy strain encountered when a belt is drawn taut on the pulleys. Owing to the fact that the cross-threads resist transverse compression, the belt will have a substantially uniform cross sectional shape when bent over a pulley and will present a uniform friction surface extending substantially the full depth of the belt. The small contractions of the inner belt plies and the slight extension of the outer plies during flexure are graduated from the neutral axis of the belt so that when the belt is bent, the bent portion has a trapezoidal shape and an outward bowing of the medial portion is avoided. This gives the belt a large frictional contact with a pulley insuring the driving of the fan at high speed with minimum wear. This construction together with the wear on the thread ends promotes the life of the belt.

The cross-threads in the various fabric plies conduct the heat to the belt surfaces more rapidly than does the rubber and so reduces the temperature of the belt during use and prolongs the life of the belt. The use of a large number of contractible and extensible layers of fabric also reduces the amount of rubber required in the belt and the quantity of heat generated as the fabric layers give to a large extent the yielding properties which heretofore have been obtained largely by the rubber content. If the belt is to be run where oil is present, an oil resisting rubber compound may be employed.

It has been found in practice that the temperature of these belts during use is much lower than the temperature of belts constructed largely of cords and rubber filler and that the rubber-composition retains its rubbery qualities for a longer period than the rubber in the cord and other constructions used heretofore.

What I claim is as follows:

1. A V-shaped side-driving transmission belt having circumferential layers of fabric whose edges lie in the side surfaces of the belt; and vulcanized rubber uniting said layers.

2. A side-driving belt of approximate V-section comprising layers of fabric whose edges collectively form a laminated side-driving surface, and vulcanized rubber interposed between said layers and serving as a primary binder therefor.

3. A V-shaped transmission belt comprising circumferential layers of fabric whose edges collectively form a side driving surface, a part of said layers yielding less longitudinally than other of said layers, and a vulcanized rubber bond between the layers.

4. A transmission belt having a plurality of layers of substantially non-stretchable fabric; and a plurality of layers of circumferentially yielding fabric, the wearing surfaces of the belt consisting partly of the ends of cross-threads in the fabric.

5. A V-shaped transmission belt having superposed circumferential layers of relatively non-stretchable and stretchable fabrics extending crosswise of the belt to the side-driving surfaces of the latter, a part of the layers having cross-threads terminating in the said side-driving surfaces.

6. A transmission belt having a plurality of superimposed layers of fabric extending across the belt and bonded together, a small portion only of said layers taking the greater part of a load on the belt; and a relatively large number of cross-threads in the fabric and extending to the outer surface thereof to dissipate heat from the inner portion of the belt.

7. A V-shaped transmission belt consisting of circumferential layers of fabric extending across the belt, the medial layers yielding less longitudinally than the outer layers; a relatively small quantity of rubber-composition bonding the layers together; and a sufficient number of cross-threads in the fabric extending to the outer surface of the belt to dissipate heat rapidly from the inside of the belt.

8. A V-shaped transmission belt having a circumferential portion composed of layers of substantially non-stretchable fabric material, said layers extending to the inclined wearing surfaces of the belt; circumferentially yielding layers of filler fabric on one side of said portion; and a bonding material uniting said layers.

9. A V-shaped transmission belt having a normal axis defined by a plurality of substantially non-stretchable circumferential layers of fabric extending across the belt; and yielding filling material on the outer and inner surfaces of said layers of fabric and extending to the side surfaces of the belt.

10. A V-shaped raw-edged transmission belt consisting of parallel flat layers of fabric and a primary binder of vulcanized rubber and having substantially non-stretchable tension members disposed circumferentially in its medial portion, said members extending substantially across the belt; and layers of square woven bias-laid filler fabric on the inside and outside of the medial portion, said layers yielding longitudinally to tension and compression.

11. A V-shaped transmission belt having layers of substantially non-stretchable fabric; layers of circumferentially yielding fabric having exposed edge-portions lying in the driving surface of the belt; and a relatively small amount of rubber-composition bonding the layers of yielding fabric together whereby the deformation of the belt during use takes place chiefly in the yielding fabric.

12. An endless side-driving belt composed of convolute layers of rubberized fabric vulcanized together and having terminal side edges collectively forming the side-driving surfaces of the belt, the inner and outer layers being bias-laid and the intermediate layers straight-laid.

13. An endless belt of approximate V-section having inner and outer peripheral portions composed of convolute layers of bias-laid, rubberized fabric, and a substantially inextensible intermediate portion composed of convolute layers of straight-laid rubberized fabric, all vulcanized together, the edges of the several layers collectively forming laminated side-driving surfaces.

14. A side-driving belt of approximate V-section comprising layers of fabric whose edges collectively form a laminated side-driving surface, vulcanized rubber interposed between said layers and serving as a primary binder therefor, and a temporary protective covering on said driving surface.

15. A side-driving belt of approximate V-section comprising layers of fabric whose edges collectively form a laminated side-driving surface, vulcanized rubber interposed between said layers and serving as a primary binder therefor, and a temporary protective covering of rubber on said driving surface.

16. A V-shaped raw-edged transmission belt consisting of parallel flat layers of fabric and a primary binder of vulcanized rubber and having substantially non-stretchable tension members disposed circumferentially in its medial portion, said members extending substantially across the belt; layers of square woven bias-laid filler fabric on the inside and outside of the medial portion, said layers yielding longitudinally to tension and compression, and a relatively thin temporary protective coating of vulcanized rubber on the raw-edged surface of the belt.

In testimony whereof I hereto affix my signature.

CHARLES R. SHORT.

Witnesses:
R. K. LEE,
L. H. EMRICK.